United States Patent
Ando

(10) Patent No.: US 8,067,520 B2
(45) Date of Patent: *Nov. 29, 2011

(54) CURABLE COMPOSITION

(75) Inventor: Katsuhiro Ando, Akashi (JP)

(73) Assignee: Kaneka Corporation, Osaka (JP)

( * ) Notice: Subject to any disclaimer, the term of this patent is extended or adjusted under 35 U.S.C. 154(b) by 606 days.

This patent is subject to a terminal disclaimer.

(21) Appl. No.: 11/813,620

(22) PCT Filed: Dec. 20, 2005

(86) PCT No.: PCT/JP2005/023324

§ 371 (c)(1),
(2), (4) Date: Jan. 8, 2008

(87) PCT Pub. No.: WO2006/075482

PCT Pub. Date: Jul. 20, 2006

(65) Prior Publication Data

US 2008/0200607 A1   Aug. 21, 2008

(30) Foreign Application Priority Data

Jan. 11, 2005   (JP) .................................. 2005-004242

(51) Int. Cl.
*C08G 77/08* (2006.01)
(52) U.S. Cl. ........................... 528/18; 525/100; 525/476
(58) Field of Classification Search .................... 528/18; 525/100, 476
See application file for complete search history.

(56) References Cited

U.S. PATENT DOCUMENTS

2004/0198885 A1* 10/2004 Okamoto et al. ............. 524/394
2007/0112145 A1*  5/2007 Ando et al. .................. 525/476

FOREIGN PATENT DOCUMENTS

| JP | 52-73998 |   | 6/1977 |
| JP | 54-36395 | A | 3/1979 |
| JP | 54-88627 | A | 7/1979 |
| JP | 59-168014 | A | 9/1984 |
| JP | 60-23405 | A | 2/1985 |
| JP | 60-228516 | A | 11/1985 |
| JP | 61-268720 | A | 11/1986 |
| JP | 62-70405 | A | 3/1987 |
| JP | 63-273625 | A | 11/1988 |
| JP | 63-309424 | A | 12/1988 |
| JP | 1-272654 | A | 10/1989 |
| JP | 2-214759 | A | 8/1990 |
| JP | 3-72527 | A | 3/1991 |
| JP | 9-272714 | A | 10/1997 |
| JP | 9-279047 | A | 10/1997 |
| JP | 2002-309077 | A | 10/2002 |
| JP | 2004-225020 | A | 8/2004 |

OTHER PUBLICATIONS

Abstract, JP 09-279047 Oct. 1997.*
International Search Report of PCT/JP2005/023324, date of mailing Feb. 28, 2006.

* cited by examiner

*Primary Examiner* — Margaret Moore
(74) *Attorney, Agent, or Firm* — Westerman, Hattori, Daniels and Adrian, LLP

(57) ABSTRACT

It is an object of the present invention to provide a two-component curable composition whose component A is easy to be handled, and which shows excellent internal curability and good storage stability. This problem is solved using a two-component curable composition, comprising component A comprising 100 parts by weight of an organic polymer containing a reactive silicon group, (B) 0.1-300 parts by weight of an epoxy group-containing compound, and (C) 0.1-20 parts by weight of water, and component B comprising (D) 0.1-20 parts by weight of a curing catalyst, and (E) 0.1-200 parts by weight of an amine compound.

11 Claims, No Drawings

CURABLE COMPOSITION

TECHNICAL FIELD

The present invention relates to a curable composition which is useful as sealing material, coating material, adhesive material, injecting material, putty material, damping material, soundproof material, buffer material, and the like for building use, civil engineering use, industrial use, electric and electronic use, and the like.

BACKGROUND ART

Room-temperature curable compositions comprising an organic polymer having a silicon-containing group which has a hydroxyl or hydrolyzable group bonded to the silicon atom and which is crosslinkable by forming a siloxane bond (hereinafter referred to as a "reactive silicon group") in combination with an epoxy resin show various properties such as proper workability and curability, stable rubber elasticity over a wide temperature range, good adhesiveness with an adherend, and are widely used as sealing material, coating material, adhesive material, and the like for building use, civil engineering use, industrial use, and the like where epoxy resin or polyurethane resin had been conventionally employed (See Patent document 1, for example).

Reactive silicon group-containing polyoxyalkylene polymers are hydrolyzed and condensed in the presence of a curing catalyst due to moisture in the air, and changes into rubber-like elastomer. However, a curable composition containing said polymer was disadvantageous in that the inside of the composition did not cure over a prolonged period of time in the construction between non-porous substrates though which water was hard to penetrate, the construction where the composition was given thick, the construction under cold and low-humidity conditions during winter season, and the like.

For solving such a problem, proposed is addition of water to the composition (See Patent documents 2 and 3, for example). Both documents disclose the two-component composition which is composed of component A comprising a reactive silicon group-containing polyoxyalkylene polymer, a curing agent for epoxy resin, and a curing catalyst, and component B comprising an epoxy resin and water, and confirm that such constitution improves internal curability of the composition. In this component A, however, the reactive silicon group-containing polyoxyalkylene polymer coexists with its curing catalyst, so that it was disadvantageous in that the air must be strictly cut off during the container-filling upon preparation of component A, its prolonged storage, the mixing procedure with component B, and the like thereby hindering easy handling.

Further, a two-component composition is proposed which employs a specific curing catalyst and thus omits water content control in component A, and which is excellent in internal curability and easy handleability of component A (See Patent document 4, for example). This two-component composition is composed of component A comprising a reactive silicon group-containing polyoxyalkylene polymer, a curing agent for epoxy resin, and a silane coupling agent, and component B comprising an epoxy resin, the specific curing catalyst and water.

Also proposed is a two-component composition which is composed of component A comprising a reactive silicon group-containing polyoxyalkylene polymer, a curing agent for epoxy resin, a silane coupling agent, and water, and component B comprising an epoxy resin, and a curing catalyst, and which can assure the balance between easy handleability of component A and internal curability (See Patent document 5, for example).

Patent document 1: JP 1,727,750, B
Patent document 2: JP Sho63-273,625, A
Patent document 3: JP Hei9-279,047, A
Patent document 4: JP 2002-309,077, A
Patent document 5: JP 2004-225,020, A

DISCLOSURE OF THE INVENTION

Problems to be Solved by the Invention

However, the two-component composition disclosed in Patent document 4 (JP 2002-309,077, A), whose curing catalyst is less active, does not show sufficient curability on the surface and within the inside for the application where rapid curing is required, for example the plant line.

Additionally, the two-component composition disclosed in Patent document 5 (JP 2004-225,020, A) tends to lower the curability after component A is stored over a prolonged period of time, and thus has a defect in its long-term storage stability.

It is the problems to be solved by the invention to provide a two-component curable composition whose component A is easy to be handled, and which shows excellent internal curability and good storage stability.

Means for Solving the Problem

For solving the above problems, the inventor studied, and has finally found that a curable composition comprising the following components: component A comprising a reactive silicon group-containing organic polymer, an epoxy group-containing compound, and water, and component B comprising a curing catalyst, and an amine compound was effective.

Thus the present invention is related to a two-component curable composition, comprising component A comprising (A) 100 parts by weight of an organic polymer containing a reactive silicon group of the following general formula (1):

$$-Si(R^1{}_{3-a})X_a \quad (1)$$

where $R^1$ represents an alkyl group of 1 to 10 carbon numbers, an aryl group of 6 to 10 carbon numbers, or an aralkyl group of 7 to 10 carbon numbers, X represents a hydroxy group or a hydrolyzable group, and the subscript a is 1, 2, 3; (B) 0.1-300 parts by weight of an epoxy group-containing compound, and (C) 0.1-20 parts by weight of water, and component B comprising (D) 0.1-20 parts by weight of a curing catalyst, and (E) 0.1-200 parts by weight of an amine compound.

Preferably, the main chain skeleton of constituent (A) comprises a polyoxyalkylene polymer and/or an alkyl (meth) acrylate ester polymer.

Also preferably, the component A and/or component B further comprise(s) (F) 0.1-20 parts by weight of a silane coupling agent.

Also preferably, the component A and/or component B further comprise(s) (G) 50-800 parts by weight of an inorganic filler.

Also preferably, the component A and/or component B further comprise(s) (H) 1-300 parts by weight of a plasticizer.

Furthermore, according to one embodiment of the invention, a sealing material comprising the above two-component curable composition is provided.

According to another embodiment of the invention, a coating material comprising the above two-component curable composition is provided.

According to another embodiment of the invention, an adhesive material comprising the above two-component curable composition is provided.

Effect of the Invention

It is possible to obtain the two-component curable composition whose component A is easy to be handled, and which shows excellent internal curability and good storage stability.

BEST MODE FOR CARRYING OUT THE INVENTION

Now, the present invention is described in detail.

The constituent (A) according to the present invention: an organic polymer containing a reactive silicon group includes a polyoxyalkylene polymer and/or an alkyl (meth)acrylate ester polymer.

The reactive silicon group includes a group of the following general formula (1):

$$-Si(R^1{}_{3-a})X_a \qquad (1)$$

($R^1$ represents an alkyl group of 1 to 10 carbon numbers, an aryl group of 6 to 10 carbon numbers, or an aralkyl group of 7 to 10 carbon numbers, and X represents a hydroxy group or a hydrolyzable group. The subscript a is 1, 2, or 3.)

Examples of the above hydrolyzable group include a hydrogen atom, a halogen atom, an alkoxy group, an acyloxy group, a ketoximate group, an amino group, an amide group, an acid amide group, an aminooxy group, a mercapto group, and an alkenyloxy group. Among these groups, an alkoxy group is preferred, and further, an alkoxy group such as methoxy group, ethoxy group, propoxy group, isopropoxy group is particularly preferred from the viewpoint that it is moderately hydrolyzable and easily handleable.

One to three hydroxy groups or hydrolyzable groups can be bonded to one silicon atom. When 2 or more groups exists in the reactive silicon group, they may be the same or different.

Specific examples of $R^1$ in the above general formula (1) include an alkyl group such as methyl group and ethyl group, a cycloalkyl group such as cyclohexyl group, an aryl group such as phenyl group, an aralkyl group such as benzyl group, and the like. As the $R^1$, methyl group is particularly preferred.

The main chain structure of the polyoxyalkylene polymer should be a polymer having the structure shown by —R—O— as its repeating unit, in which R should be a bivalent organic group of 1-20 carbon numbers. Further, it may be a homopolymer whose repeating units are all the same, or a copolymer containing two or more kinds of repeating units. Further, the main chain may contain a branched structure. Specific examples of R include —CH$_2$CH$_2$—, —CH(CH$_3$)CH$_2$—, —CH(C$_2$H$_5$)CH$_2$—, —C(CH$_3$)$_2$CH$_2$—, —CH$_2$CH$_2$CH$_2$CH$_2$—, and the like. As R, —CH(CH$_3$)CH$_2$— is particularly preferred.

The main chain structure of the polyoxyalkylene polymer can be obtained by ring-opening polymerization of monoepoxide in the presence of, for example, an initiator, and a catalyst. The initiator includes a monohydric alcohol, a dihydric alcohol, a polyhydric alcohol, various kinds of oligomer having a hydroxyl group(s), and the like. The monoepoxide includes an alkylene oxide such as propylene oxide, ethylene oxide, and an alkyl glycidyl ether such as butyl glycidyl ether; an allyl glycidyl ether; an aryl glycidyl ether, and the like. As the catalyst, there can be employed an alkali catalyst such as KOH, NaOH, an acid catalyst such as trifluoroborane-etherate, alumino-porphyrin metal complex, a composite metal cyanide complex catalyst such as zinc cobalt cyanide-glyme complex catalyst. Particularly preferred is a composite metal cyanide complex catalyst which invites less side reaction, but the other may be used.

Further, the main chain structure of the polyoxyalkylene polymer can be obtained by chain extension of a hydroxyl-terminated polyoxyalkylene polymer with a bi- or more functional alkyl halide such as CH$_2$Cl$_2$, CH$_2$Br$_2$ in the presence of a basic compound such as KOH, NaOH, KOCH$_3$, NaOCH$_3$. Furthermore, the chain extension of a hydroxyl-terminated polyoxyalkylene polymer with a bifunctional or trifunctional isocyanate compound can be mentioned.

For introduction of the reactive silicon group into the polyoxyalkylene polymer, preferred is the reaction of, for example, a polyoxyalkylene polymer terminated with an unsaturated group of the general formula (2) in one molecule:

$$CH_2=C(R^3)-R^2-O- \qquad (2)$$

($R^2$ is a bivalent organic group of 1-20 carbon numbers, and $R^3$ is hydrogen atom or a hydrocarbon group of 10 or less carbon numbers.)

with a reactive silicon group-containing compound of the general formula (3):

$$H-Si(R^1{}_{3-a})X_a \qquad (3)$$

($R^1$, X, and a are mentioned above.)

In the presence of an VIII group transition metal catalyst.

Also, it can be obtained by reaction of a hydroxy-terminated polyoxyalkylene polymer with a reactive silicon group-containing isocyanate compound, reaction of an isocyanate-terminated polyoxyalkylene polymer with a reactive silicon group-containing amine compound, reaction of an isocyanate-terminated polyoxyalkylene polymer with a reactive silicon group-containing mercaptan compound, and the like.

Conventional known methods may be used for production of a polyoxyalkylene polymer having an unsaturated group of the general formula (2) at its terminus. For example, there can be mentioned the method of reacting a hydroxy-terminated polyoxyalkylene polymer with an unsaturated bond-containing compound to combine them via ether bond, ester bond, urethane bond, carbonate bond, and the like. For example, in case of introduction of an unsaturated bond via ether bond, there can be mentioned the method of subjecting the terminal hydroxyl group of the polyoxyalkylene polymer to metal oxidation leading to —OM (M is Na, K, or the like), and then reacting it with an unsaturated group-containing compound of the general formula (4):

$$CH_2=C(R^3)-R^2-X^2 \qquad (4)$$

($R^2$ and $R^3$ are defined above, and $X^2$ is a halogen atom).

Specific examples of the unsaturated group-containing compound of the general formula (4) include CH$_2$=CH—CH$_2$—Cl, CH$_2$=CH—CH$_2$—Br, CH$_2$=CH—C$_2$H$_4$—Cl, CH$_2$=C(CH$_3$)—CH$_2$—Cl, and the like. Particularly preferred are CH$_2$=CH—CH$_2$—Cl, CH$_2$=C(CH$_3$)—CH$_2$—Cl in view of the reactivity.

In the other introduction methods of an unsaturated group, there can be employed an isocyanate compound, carboxylic acid, or epoxy compound which has CH$_2$=CH—CH$_2$— group, CH$_2$=C(CH$_3$)—CH$_2$— group, or the like.

The VIII group transition metal catalyst includes, for example, H$_2$PtCl$_6$.6H$_2$O, platinum-vinylsiloxane complex, platinum-olefin complex, platinum metal, RhCl(PPh$_3$)$_3$, RhCl$_3$, Rh/Al$_2$O$_3$, RuCl$_3$, IrCl$_3$, FeCl$_3$, PdCl$_2$.2H$_2$O, NiCl$_2$, and the like. In view of reactivity of the hydrosilylation, any of H$_2$PtCl$_6$.6H$_2$O, platinum-vinylsiloxane complex, and platinum-olefin complex is particularly preferred.

These production methods are described in, for example, JP 1,396,791, B; JP 1,727,750, B; JP 2,135,751, B; JP 2,995,568, and the like.

The molecular weight of the polyoxyalkylene polymer is not particularly limited. Preferably, the number average molecular weight in GPC (gel permeation chromatography) on polystyrene equivalency ranges from 500 to 100,000. Further, the range of 1,000 to 70,000 is preferred in view of easy handleability, and the like.

Alkyl (meth)acrylate monomers in the alkyl (meth)acrylate ester polymer are represented by the following general formula (5):

$$CH_2=C(R^4)COO-R^5 \quad (5)$$

(In the formula, $R^4$ is hydrogen atom or methyl group, and $R^5$ represents an alkyl group of 1-30 carbon numbers.)

Specific examples of said $R^5$ include, for example, methyl group, ethyl group, propyl group, n-butyl group, tert-butyl group, 2-ethylhexyl group, lauryl group, tridecyl group, cetyl group, stearyl group, alkyl group of 22 carbon numbers, and the like. These may be the same or different.

Specific examples of said general formula (5) include, for example, methyl (meth)acrylate, ethyl (meth)acrylate, n-propyl (meth)acrylate, n-butyl (meth)acrylate, isobutyl (meth)acrylate, tert-butyl (meth)acrylate, n-hexyl (meth)acrylate, 2-ethylhexyl (meth)acrylate, decyl (meth)acrylate, undecyl (meth)acrylate, lauryl (meth)acrylate, tridecyl (meth)acrylate, myristyl (meth)acrylate, cetyl (meth)acrylate, stearyl (meth)acrylate, behenyl (meth)acrylate, biphenyl (meth)acrylate, and the like. One kind or two or more kinds of these monomers may be used.

As monomer units of the alkyl (meth)acrylate ester polymer, copolymerizable monomer units can be introduced in addition to the alkyl (meth)acrylate monomer units. They include a monomer unit derived from an acrylic acid such as acrylic acid, methacrylic acid; an amide group-containing monomer such as acrylamide, methacrylamide, N-methylol acrylamide, N-methylol methacrylamide, an epoxide group-containing monomer such as glycidyl acrylate, glycidyl methacrylate, an amino group-containing monomer such as diethylaminoethyl acrylate, diethylaminoethyl methacrylate, aminoethyl vinyl ether; other monomers such as acrylonitrile, styrene, α-methylstyrene, alkyl vinyl ether, vinyl chloride, vinyl acetate, vinyl propionate, ethylene, and the like.

The molecular weight of the alkyl (meth)acrylate ester polymer is not particularly limited. Preferably, the number average molecular weight in GPC (gel permeation chromatography) on polystyrene equivalency ranges from 500 to 100,000. Further, the range of 1,000 to 50,000 is more preferred in view of easy handleability, and the like.

The alkyl (meth)acrylate ester polymer can be obtained in conventional methods of vinyl polymerization. For example, it can be obtained by polymerization using radical reaction-based solution polymerization, bulk polymerization, or the like, but they are not particularly limited to these methods. The reaction is normally conducted by adding the above monomers and a radical initiator, a chain-transfer agent, a solvent, and the like for the reaction at 50-150° C.

Examples of the radical initiator include azobisisobutyronitrile, benzoyl peroxide, and the like, and examples of the chain-transfer agent include a mercaptan such as n-dodecyl mercaptan, tert-dodecyl mercaptan, lauryl mercaptan, a halogen-containing compound. As the solvent, an unreactive solvent such as an ether, a hydrocarbon, an ester is preferably used.

Introduction of the reactive silicon group into the alkyl (meth)acrylate ester polymer is attained in various methods which include (I) the method of copolymerizing with a compound having a polymerizable unsaturated bond, and a reactive silicon group, (II) the method of copolymerizing with a compound having a polymerizable unsaturated bond, and a reactive functional group (hereinafter referred to as Y group) (for example, acrylic acid), and then reacting the resulting polymer with a compound having a reactive silicon group and a functional group reactive with the Y group (hereinafter referred to as Y' group) (for example a compound having isocyanate group and —$Si(OCH_3)_3$ group), (III) the method of copolymerizing using a reactive silicon group-containing mercaptan as the chain-transfer agent, (IV) the method of copolymerizing using a reactive silicon group-containing azobisnitrile compound or disulfide compound as the initiator, (V) the method of polymerizing a monomer by living radical polymerization method, and introducing the reactive silicon group into the molecular terminus, and the like, without particular limitation. Also, it is possible to optionally combine any of the methods (I)-(V). For example, as combination of (I) with (III), possible is the method of copolymerizing a monomer with a compound having a polymerizable unsaturated bond, and a reactive silicon group in the presence of a reactive silicon group-containing mercaptan as the chain-transfer agent.

The compound having a polymerizable unsaturated bond, and a reactive silicon group described in (I) is represented by the general formula (6):

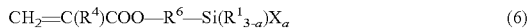

$$CH_2=C(R^4)COO-R^6-Si(R^1_{3-a})X_a \quad (6)$$

($R^6$ represents a bivalent alkylene group of 1-6 carbon numbers. $R^4$, $R^1$, X, and a are defined above.)

As the $R^6$, there can be mentioned a bivalent alkylene group of 1-6, preferably 1-4, carbon numbers, such as methylene group, ethylene group, propylene group.

The compound represented by the general formula (6) includes, for example, γ-methacryloxypropyl alkyl polyalkoxysilane such as γ-methacryloxypropyl trimethoxysilane, γ-methacryloxypropyl methyl dimethoxysilane, γ-methacryloxypropyl triethoxysilane, γ-acryloxypropyl alkyl polyalkoxysilane such as γ-acryloxypropyl trimethoxysilane, γ-acryloxypropyl methyl dimethoxysilane, γ-acryloxypropyl triethoxysilane, and the like. One kind or two or more kinds of these compounds may be used.

Examples of the Y group and Y' group described in (II) include combination of various groups, for example, amino group, hydroxyl group, carboxylic acid group as the Y group, and isocyanate group as the Y' group. Another example includes ally group as the Y group, and hydrosilyl group (H—Si) as the Y' group as described in JP Sho54-36,395, A; JP Hei1-272,654, A; and JP Hei2-214,759, A. In this case, the Y group can be bonded to the Y' group by hydrosilylation reaction in the presence of an VIII group transition metal.

The reactive silicon group-containing mercaptan to be used as the chain-transfer agent described in (III) includes γ-mercaptopropyltrimethoxysilane, γ-mercaptopropylmethyidimethoxysilane, γ-mercaptopropyltriethoxysilane, and the like.

The reactive silicon group-containing azobisnitrile compound or disulfide compound as described in (IV) include, for example, an alkoxysilyl group-containing azobisnitrile compound, an alkoxysilyl group-containing disulfide compound, as described in JP Sho60-23,405, A; and JP Sho62-70,405, A.

As the method described in (V), methods described in JP Hei9-272,714, A can be mentioned.

Further, the method of using the reactive silicon group-containing mercaptan in combination with the reactive silicon group-containing radical polymerization initiator as described in JP Sho59-168,014, A; and JP Sho60-228,516, A can be mentioned.

The number of the reactive silicon group contained in the alkyl (meth)acrylate ester polymer is not particularly limited, but ranges preferably from 0.1 to 5, more preferably from 0.2 to 3, on average in one molecule of the copolymer, in view of adhesive strength or cost.

Conventionally known compounds can be widely used as the epoxy group-containing compound as the constituent (B) according to the present invention. For example, there can be mentioned an epoxy resin such as bisphenol A epoxy resin, bisphenol F epoxy resin, bisphenol AD epoxy resin, bisphenol S epoxy resin, their hydrogenated epoxy resin, bisphenol A-oxypropylene glycidyl ester type epoxy resin, glycidyl amine type epoxy resin, alicyclic epoxy resin, novolac-type epoxy resin, urethane bond-containing urethane-modified epoxy resin, fluorinated epoxy resin, polybutadiene- or NBR-containing rubber-modified epoxy resin, fire-retardant epoxy resin such as glycidyl ether of tetrabromobisphenol A, diglycidyl ether resulted from introduction of oxypropylene chain into bisphenol A; an epoxy type diluent such as n-butyl glycidyl ether, 2-ethylhexyl glycidyl ether, dodecyl glycidyl ether, tridecyl glycidyl ether, phenyl glycidyl ether, cresyl glycidyl ether, p-sec-butylphenyl glycidyl ether, glycidyl methacrylate, ethylene glycol diglycidyl ether, 1,4-butanediol diglycidyl ether, 1,6-hexanediol diglycidyl ether, (poly)ethylene glycol diglycidyl ether, (poly)propylene glycol diglycidyl ether, trimethylolpropane triglycidyl ether, glycerin triglycidyl ether; an epoxy group-containing silane such as γ-glycidoxypropyl trimethoxysilane, γ-glycidoxypropyl methyldimethoxysilane, γ-glycidoxypropyl triethoxysilane, β-(3,4-epoxycyclohexyl)ethyl trimethoxysilane, and the like. One kind, or two or more kinds of these epoxy group-containing compounds can be used. Among these epoxy group-containing compounds, the epoxy resin is more preferred in view of workability, curability, adhesiveness, adhesive strength, and the like, and further, bisphenol A epoxy resin is particularly preferred in view of water resistance, decay resistance, and the like.

The constituent (B) epoxy group-containing compound is preferably used in 0.1-300 parts by weight, and more preferably 1-200 parts by weight, relative to 100 parts by weight of the constituent (A). When it is less than 0.1 parts by weight, adhesiveness and adhesive strength are insufficient. When it exceeds 300 parts by weight, it is unfavorable since the elongation of the cured product is insufficient.

Water as constituent (C) according to the present invention is required for hydrolysis in the cure process of constituent (A), and normal tap water, industrial water, pure water, or the like is used. Upon use at lowered temperature during winter season, it is also possible to add various salts or alcohols for depressing freeze point. Its additive amount ranges, preferably, from 0.1 to 20 parts by weight, more preferably from 0.2 to 10 parts by weight, relative to 100 parts by weight of constituent (A). When it is less than 0.1 parts by weight, internal curability is insufficient. When it exceeds 200 parts by weight, unfavorable separation in the composition occurs.

The curing catalyst as constituent (D) according to the present invention is a silanol condensation catalyst which promotes the curing of the constituent (A). Conventionally known catalysts to be used in the condensation of the reactive silicon group-containing polymer can be widely used, and specific examples thereof includes, for example, tin compounds such as dibutyltin dimethoxide, dibutyltin diphenoxide, dibutyltin dinonylphenoxide, dibutyltin diacetate, dibutyltin dioctoate, dibutyltin di2-ethylhexanoate, dibutyltin dilaurate, bis(dibutyltin laurate) oxide, dibutyltin maleate, dibutyltin phthalate, dibutyltin dimethylmaleate, dibutyltin diethylmaleate, dioctyltin dimethoxide, dioctyltin diacetate, dioctyltin di2-ethylhexanoate, dioctyltin dilaurate, dioctyltin maleate, dioctyltin diethylmaleate, dibutyltin oxide, reaction product of dibutyltin oxide with phthalate ester, reaction product of dibutyltin oxide with maleate ester, reaction product of dibutyltin diacetate with tetraethyl silicate, dibutyltin bisacetylacetonate, tin octate, tin 2-ethylhexanoate, tin naphthenate, tin stearate, tin versatate; titanium compounds such as tetrabutyl titanate, tetraisopropyl titanate, titanium tetraacetylacetonate; aluminum compounds such as aluminum trisacetylacetonate, aluminum trisethylacetoacetate, diisopropoxy aluminum ethylacetoacetate; zirconium compounds such as zirconium tetraacetylacetonate; bismuth compounds such as bismuth tris(2-ethylhexanoate); iron compounds such as iron naphthenate; zinc compounds such as zinc octylate; phosphorous compounds such as acid phosphate ester; reaction product of acid phosphate ester with amine; amine compounds; salt of an amine compound with carboxylic acid, and the like. One kind, or two or more kinds of these catalysts may be used. Among these curing catalysts, an organotin compound is more preferred in view of curability, storage stability, and physical-property balance. Particularly preferred is a tetravalent tin compound in view of curing rate, and storage stability.

The above compounds exemplified as the constituent (D) include the amine compounds, i.e. the reaction product of acid phosphate ester with amine; amine compounds; salt of an amine compound with carboxylic acid, and the like. In case these inclusion makes a distinction between the amine compound as constituent (E), and the curing catalyst (silanol condensation catalyst) as constituent (D) unclear, and makes it difficult to understand the invention, it is possible to regard the amine compound that naturally acts as the silanol condensation catalyst, as the (E) amine compound, but not as the constituent (D) in order to understand the present invention.

The used amount of constituent (D) ranges from 0.1 to 20 parts by weight relative to 100 parts by weight of constituent (A), and preferably from 0.1 to 10 parts by weight, more preferably from 0.2 to 6 parts by weight. When it is less than 0.1 parts by weight, curability is insufficient. When it exceeds 10 parts by weight, it is unfavorable since decrease in the adhesiveness, and the like occur.

Concerning the constituent (E) amine compound of the present invention, conventionally known compounds can be widely employed. For example, it includes aliphatic amines such as ethylenediamine, diethylenetriamine, triethylenetetramine, tetraethylenepentamine, diethylaminopropylamine, hexamethylenediamine, methylpentamethylenediamine, trimethylhexamethylenediamine, guanidine, oleylamine, N,N,N',N',-tetramethylethylenediamine, N,N,N',N',-tetramethyl-1,3-diaminopropane, N,N,N',N',-tetramethyl-1,4-diaminobutane, N,N,N',N',-tetramethyl-1,6-diaminohexane; alicyclic amines such as menthen diamine, isophorone diamine, norbornane diamine, piperidine, N,N'-dimethylpiperadine, N-aminoethylpiperadine, 1,2-diaminocyclohexane, bis(4-amino-3-methylcyclohexyl)methane, bis(4-aminocyclohexyl)methane, polycyclohexyl polyamine, 1,8-diazabicyclo[5,4,0]undecene-7 (DBU), 1,5-diazabicyclo[4,3,0]nonene-5,6-dibutylamino-1,8-diaza-bicyclo[5,4,0]undecene-7, N,N-dimethylcyclohexylamine, 1,2-bis(dimethylamino)cyclohexane, 1,4-bis(dimethylamino)cyclohexane, N,N,N',N',-tetramethylisophoronediamine, N,N,N',N',-tetramethylnorbornanediamine, bis(4-dimethylaminocyclohexyl)methane, bis(4-dimethylamino-3-methylcyclohexyl)methane; aromatic amines such as meta-phenylenediamine, 4,4'-diaminodiphenylmethane, 4,4'-diaminodiphenylsulfone, N,N,N',N'-tetramethyl-1,4-phenylenediamine, N,N-dimethylbenzylamine, α-methylbenzyldimethylamine; aliphatic aromatic amines such as m-xylylenediamine, benzyldimethylamine, 2-(dimethylaminomethyl)phenol, 2,4,6-tris(dimethylaminomethyl)phenol; ether bond-containing amines such as 3,9-bis(3-aminopropyl)-2,4,8,10-tetraoxaspiro[5,5]undecane (ATU), morpholine, N-methylmorpholine, polyoxypropylene diamine, polyoxypropylene triamine, polyoxyethylene diamine; hydroxyl group-containing amines such as diethanol amine, triethanol amine; acid anhydrides such as tetrahydro phthalic anhydride, methyl tetrahydro phthalic anhydride, methyl nadic anhydride, hexahydro phthalic anhydride, dodecyl succinic anhydride; polyamide amines such as polyamide obtained by reaction of dimer acid with a polyamine such as diethylenetriamine or triethylenetetraamine, polyamide from the other polycarboxylic acids than dimer acid; imidazoles such as 2-ethyl-4-methylimidazole; dicyanodiamide; polyoxypropylene amines such as polyoxypropylene diamine, polyoxypropylene triamine; phenols; modified amines such as epoxy-modified amine obtained by reaction of the above amines with an epoxy compound, Mannich-modified amine obtained by reaction of the above amines with formalin and phenols, Michael addition-modified amine, ketimine; amine salts such as salt of 2,4,6-tris(dimethylaminomethyl)phenol with 2-ethyihexanoic acid, and the like. One kind of these may be used, and two or more kinds may be combined. In view of curability and physical-property balance, 2,4,6-tris(dimethylaminomethyl)phenol, and polyoxypropylene diamine are preferred among these amine compounds.

Besides, amine compounds that are known as the curing agents for epoxy resin are preferred as the constituent (E) amine compound. Further, amine compounds containing none of the reactive silicon group are preferred since any unintended side reactions might progress due to the presence of the reactive silicon group.

Such constituent (E) amine compound is preferably used in 1 to 200 parts by weight relative to 100 parts by weight of constituent (A), and more preferably 2 to 100 parts by weight. When it is less than 1 part by weight, the curing of the epoxy resin is insufficient, and adhesive strength will decrease. When it exceeds 200 parts by weight, it is unfavorable since the bleeding into the surface occurs and adhesiveness will decrease.

Concerning the constituent (F) silane coupling agent of the present invention, conventionally known compounds can be widely employed. For example, it includes amino group-containing silanes such as γ-aminopropyl trimethoxysilane, γ-aminopropyl methyidimethoxysilane, N-(β-aminoethyl)-γ-aminopropyl trimethoxysilane, N-(β-aminoethyl)-γ-aminopropyl methyidimethoxysilane, N-(β-aminoethyl)-γ-aminopropyl triethoxysilane, γ-ureidopropyl triethoxysilane, N-β-(N-vinylbenzylaminoethyl)-γ-aminopropyl trimethoxysilane, γ-anilinopropyl trimethoxysilane; mercapto group-containing silanes such as γ-mercaptopropyl trimethoxysilane, γ-mercaptopropyl triethoxysilane, γ-mercaptopropyl methyldimethoxysilane, γ-mercaptopropyl methyldiethoxysilane; epoxy group-containing silanes such as γ-glycidoxypropyl trimethoxysilane, γ-glycidoxypropyl methyldimethoxysilane, γ-glycidoxypropyl triethoxysilane, β-(3,4-epoxycyclohexyl)ethyl trimethoxysilane, carboxysilanes such as β-carboxylethylphenyl bis(2-methoxyethoxy) silane, N-β-(N-carboxylmethylaminoethyl)-γ-aminopropyl trimethoxysilane; ketiminated silanes obtained by dehydration condensation of amino group-containing silanes with various ketones; reaction product of amino group-containing silanes with epoxy group-containing silanes; reaction product of mercapto group-containing silanes with epoxy group-containing silanes; reaction product of amino group-containing silanes with epoxy resin; reaction product of mercapto group-containing silanes with epoxy resin; ethylsilicates such as tetraethoxysilane, tetraethoxysilane tetramer, tetraethoxysilane hexamer; vinyl silanes such as vinyl trimethoxysilane, vinyl triethoxysilane, vinyl triacetoxysilane; methacryloxysilanes such as 3-methacryloxypropyl trimethoxysilane, 3-methacryloxypropyl triethoxysilane, and the like. One kind of these silane coupling agents may be used, and two or more kinds may be combined.

The used amount of constituent (F) preferably ranges from 0.1 to 20 parts by weight relative to 100 parts by weight of constituent (A), and more preferably from 0.2 to 10 parts by weight. When it is less than 0.1 parts by weight, decrease in adhesiveness and decrease in storage stability are invited. When it exceeds 20 parts by weight, it is unfavorable since curing inhibition might occur.

Specific examples of the constituent (G) inorganic filler according to the present invention include heavy calcium carbonate, light calcium carbonate, colloidal calcium carbonate, magnesium carbonate, clay, kaolin, talc, mica, silica (fumed silica, precipitated silica, crystalline silica, molten silica, dolomite, silicic anhydride, hydrous silicic acid, and the like), titanium oxide, diatom earth, and the like. One kind of these inorganic fillers may be used, and two or more kinds may be mixed for use. Particularly use of heavy calcium carbonate, or colloidal calcium carbonate is preferable in view of workability, cost, physical-property balance, and the like.

The used amount of constituent (G) preferably ranges from 50 to 800 parts by weight relative to 100 parts by weight of constituent (A), and more preferably from 70 to 500 parts by weight. When it is less than 50 parts by weight, it is unfavorable since the viscosity of the composition would decrease and the end breakage property will deteriorate. When it exceeds 800 parts by weight, it is unfavorable since the viscosity of the composition will increase, and workability will decrease.

Specific examples of the constituent (H) plasticizer according to the present invention include phthalate esters such as dibutyl phthalate, di(2-ethylhexyl) phthalate, diisononyl phthalate, diisodecyl phthalate, butylbenzyl phthalate; non-aromatic dibasic acid esters such as dioctyl adipate, dioctyl sebacate, dibutyl sebacate, isodecyl succinate; fatty acid esters such as butyl oleate, methyl acetylricinoate; esters of polyalkylene glycol such as diethylene glycol dibenzoate, triethylene glycol dibenzoate, pentaerythritol ester; phosphate esters such as tricresyl phosphate, tributyl phosphate; trimellitic acid esters; alkyl sulfonate esters such as alkyl sulfonate phenyl esters; polybutadiene, polybutene, polyisobutylene, butadiene-acrylonitrile, polychloroprene; chlorinated paraffins; hydrocarbon oils such as alkyldiphenyl, partially hydrogenated terphenyl; process oils; polyethers such as polyether polyols such as polyethylene glycol, polypropylene glycol, polytetramethylene glycol, derivatives obtained by converting hydroxyl group of the polyether polyol to ester group, ether group, and the like; epoxidized plasticizers such as epoxidized soybean oil, benzyl epoxystearate; polyester plasticizers obtained from dibasic acids such as sebacic acid, adipic acid, azelaic acid, phthalic acid, with dihydric alcohol such as ethylene glycol, diethylene glycol, triethylene glycol, propylene glycol, dipropylene glycol; vinyl polymers obtained by polymerizing vinyl monomers including acrylic plasticizer in various methods, and the like. One kind of these plasticizers may be used, and two or more kinds may be used in combination.

The used amount of constituent (H) is not particularly limited, but preferably ranges from 1 to 300 parts by weight relative to 100 parts by weight of constituent (A), and more preferably from 5 to 200 parts by weight. When it is less than 1 part by weight, it will not express the effect as the plasticizer. When it exceeds 300 parts by weight, it is unfavorable since the mechanical strength of the cured product becomes insufficient.

The curable composition according to the present invention can be supplemented with, if needed, a thixotropic agent, an antioxidant, a ultraviolet absorber, a light stabilizer, a coloring agent, and the like.

Specific examples of the thixotropic agent include, for example, polyamide waxes, hydrogenated castor oil derivatives; metallic soaps such as calcium stearate, aluminum stearate, barium stearate, and the like. One kind of these thixotropic agents may be used, and two or more kinds may be used in combination.

The curable composition according to the present invention can be applied to an adherend in a bead form, or can be applied with spray, or in some cases, by flushing, or brush painting. Further, after the application, it can be cured under heating, or at room temperature for incubation.

Application for use of the curable composition according to the present invention is not particularly limited, and it can be widely used for building use, civil engineering use, industrial use, electric and electronic material use, medical material use, and the like. Concerning building use, there can be mentioned joint sealing material, coating material, primer and the like for jacket material such as various metal panels, siding boards; sealing material, adhesive material, injecting material, damping material, soundproof material, electromagnetic wave-blocking conducting material, putty material and the like to be used between jacket material, base sheet, or ceiling material and interior material; adhesive material for bonding tile or stone to exterior wall material or base sheet; adhesive material, pressure-sensitive adhesive and the like for bonding wooden flooring material, polymeric floor sheet, or floor tile to various floors; injecting material for repairing cracks in various jacket material, or interior material, and the like. Concerning civil engineering use, there can be mentioned joint sealing material, coating material, primer, painting, injecting material, putty material, molding material, spraying material, and the like for road, bridge, tunnel, breakwater, or various concrete products. Concerning industrial use, sealing material, coating material, buffer material, damping material, soundproof material, spraying material and the like for automotive body; adhesive material, pressure-sensitive adhesive, coating material, foamed material and the like for automotive interior; sealing material, adhesive material and the like for automotive parts; sealing material, adhesive material, coating material, and the like for joint of various steel sheets in truck, bus, and the like. Concerning the other applications, there can be mentioned adhesive material, sealing material for components of various electric and electronic products, electric and electronic component material such as sealant for back of solar battery, electric insulation material such as insulating coating material for electric wire or cable, thermally-conductive material, hot-melt material, electric and electronic potting material, medical rubber material, medical pressure-sensitive adhesive, sealing material for medical equipment, liquid sealing material for use in food packing material, film, gasket, various forming material, electric components, or various machinery components, and the like.

EXAMPLES

Next, specific working examples are cited in order to illustrate the present invention more clearly, but will never restrict the present invention.

Synthetic Example 1

By use of a polypropylene triol having a number average molecular weight of 3,000 as an initiator and zinc hexacyanocobaltate-glyme complex as a catalyst, polymerization of propylene oxide was carried out to yield a polyoxypropylene trio having a number average molecular weight of 12,000. Then, a methanol solution of NaOMe was added in an amount of 1.2 equivalents in relation to the hydroxy group of the above hydroxy group-terminated polyoxypropylene. After the reaction, the methanol was distilled off, and 3-chloro-1-propene was further added to thereby convert the terminal hydroxy group into allyl group. To 500 grams of the resulting polymer was added 10 grams of hexane, followed by azeotropic dehydrating at 90° C. Hexane was distilled off under reduced pressure, followed by nitrogen displacement. To this was added 30 μl of platinum divinyidisiloxane complex (3 wt % on platinum basis of xylene solution), and further, 9.25 grams of dimethoxy methylsilane (DMS) was slowly added dropwise under stirring. The mixed solution was allowed to react at 90° C. for two hours, and the unreacted DMS was distilled off under reduced pressure to give the reactive silicon group-containing polyoxypropylene polymer. It was confirmed that the resulting polymer had a number average molecular weight of 12,500 based on GPC analysis (polystyrene equivalency), and the introduction ratio of the reactive silicon group to the terminal was 83% from $^1$H-NMR analysis (polymer A).

Synthetic Example 2

The polymerization initiator, 2.6 grams of azobisisobutyronitrile, was dissolved into a mixture of 6.0 grams of butyl acrylate, 66 grams of methyl methacrylate, 13 grams of stearyl methacrylate, 5.4 grams of γ-methacryloxypropyl methyl dimethoxysilane, 7.0 grams of γ-mercaptopropyl methyl dimethoxysilane, and 23 grams of toluene. The resulting solution was added dropwise for 4 hours to 43 grams of toluene heated to 110° C. After two hours, the polymerization was conducted to give a copolymer having a number average molecular weight (Mn) of 2,200 by GPC (polystyrene equivalency) at a solid concentration of 60%.

The polymer A obtained in Synthetic Example 1 was blended with this copolymer at a solid ratio (by weight) of 60/40, and degassing was conducted in a heat condition at 110° C. under reduced pressure using an evaporator to give a transparent and viscous liquid at a solid concentration of 99% or more (polymer B).

Examples 1-3, and Comparative Examples 1-3

The components A and B were prepared following the formulation shown on Table 1, for the evaluation of easy handleability of component A, coating workability, initial curability, and curability after storage. Upon mixing of the components A and B, a static mixer was used.

(1) Easy handleability of component A: Surface condition was observed after component A was allowed to stand for one hour in an open state at 23° C. and a relative humidity of 50%. The rating "Good" corresponds to the case where no substantial change is found on the surface, and it can be directly mixed with component B, and the rating "Bad" corresponds to the case where the skin is formed on the surface, cannot be directly mixed with component B.

(2) Initial curability: A composition of component A mixed with component B was adjusted to a thickness of 3 mm approximately in order to determine surface curing time and internal curing time. Concerning the surface curing, the surface of the composition is touched with a spatula temporally in order to determine the time till when the composition is not attached to the spatula. Concerning the internal curing, the composition is pressed with a spatula temporally in order to determine the time till when the deformation begins to be recovered instantly. (temperature of 23° C. and relative humidity of 50%)

The rating "Good" corresponds to the case where the surface and internal curing times are within 50 minutes, and the rating "bad" corresponds to the case where they exceeds 50 minutes.

(3) Curability after storage: The vessel charged with the components A and B was allowed to stand at 23° C. for one month, and then the curability after mixing both components was evaluated in a manner similar to the above.

The formulation and the results of evaluation were shown on Table 1.

TABLE 1

|  |  |  | Example | | | Comparative Example | | |
|---|---|---|---|---|---|---|---|---|
|  |  |  | 1 | 2 | 3 | 1 | 2 | 3 |
| Component A | (A) | Polymer A | 100 | 100 |  | 100 | 100 | 100 |
|  |  | Polymer B |  |  | 100 |  |  |  |
|  | (B) | EPIKOTE 828 *1 | 15 | 20 | 20 | 15 |  |  |
|  | (C) | Water | 1.5 | 0.5 | 0.5 |  |  |  |
|  | (D) | No. 918 *2 |  |  |  |  |  | 3 |
|  | (E) | TAP *3 |  |  |  |  | 3 | 3 |
|  | (F) | A-1120 *4 |  |  |  |  | 3 | 3 |
|  | (G) | CCR *5 |  | 50 | 50 |  |  |  |
|  |  | P-55 *6 | 110 |  |  | 110 | 80 | 40 |
| Component B | (B) | EPIKOTE 828 |  |  |  |  | 30 | 20 |
|  | (C) | Water |  |  |  |  | 2 | 1 |
|  | (D) | No. 918 | 4 | 3 | 3 | 4 | 3 |  |
|  | (E) | TAP | 4 | 3 | 3 | 4 |  |  |
|  | (F) | A-1120 | 4 | 3 | 3 | 4 |  |  |
|  | (G) | PLS505 *7 | 80 |  |  | 80 |  |  |
|  |  | P-55 |  | 30 | 30 |  | 80 |  |
|  |  | WHITON SB *8 | 30 | 70 | 70 | 30 |  |  |
|  |  | LIGHTON A *9 |  |  |  |  |  | 90 |
|  | (H) | PPG2000 *10 | 80 | 40 | 40 | 80 | 40 | 20 |
| Easy handleability of component A |  |  | Good | Good | Good | Good | Good | Bad |
| Initial curability | Surface curing time | min | 11 | 8 | 13 | 11 | 13 | 12 |
|  | Internal curing time | min | 40 | 30 | 45 | 130 | 30 | 25 |
|  | Judgement |  | Good | Good | Good | Bad | Good | Good |
| Curability after | Surface curing time | min | 14 | 11 | 15 | 15 | 120 | 14 |

TABLE 1-continued

|  |  |  | Example | | | Comparative Example | | |
|---|---|---|---|---|---|---|---|---|
|  |  |  | 1 | 2 | 3 | 1 | 2 | 3 |
| storage | Internal curing time | min | 45 | 40 | 45 | 150 | 2400 | 30 |
|  | Judgement |  | Good | Good | Good | Bad | Bad | Good |

*1 Bisphenol A epoxy resin, manufactured by Japan Epoxy Resins Co., Ltd.
*2 Organotin compound, manufactured by Sankyo Organic Chemicals Co., Ltd.
*3 2,4,6-tris(dimethylaminomethyl)phenol, manufactured by Kayaku Akzo Corporation.
*4 N-β-aminoethyl-γ-aminopropyltrimethoxysilane, manufactured by Nippon Unicar Co., Ltd.
*5 Colloidal calcium carbonate, manufactured by Shiraishi Kogyo Kaisha, Ltd.
*6 Colloidal calcium carbonate, manufactured by Konoshima Chemical Co., Ltd.
*7 Colloidal calcium carbonate, manufactured by Konoshima Chemical Co., Ltd.
*8 Heavy calcium carbonate, manufactured by Shiraishi Calcium Kaisha, Ltd.
*9 Heavy calcium carbonate, manufactured by Bihoku Funka Kogyo Co., Ltd.
*10 Manufactured by Mitsui Takeda Chemicals, INC.

Regarding the curable compositions in Examples, component A was easy to be handled, and the coating workability, and the surface and internal curability were good, and substantial change in the curability after storage was not observed.

The invention claimed is:

1. A production method for a curable composition, comprising storing each of a component A and a component B for one month, and then mixing them;
   wherein component A comprises
   (A) 100 parts by weight of an organic polymer containing a reactive silicon group of the following general formula (1):

$$—Si(R^1{}_{3-a})X_a \qquad (1)$$

where $R^1$ represents an alkyl group of 1 to 10 carbon numbers, an aryl group of 6 to 10 carbon numbers, or an aralkyl group of 7 to 10 carbon numbers, X represents a hydroxy group or a hydrolyzable group, and the subscript a is 1, 2, or 3;
   (B) 0.1-300 parts by weight of an epoxy resin, and
   (C) 0.1-20 parts by weight of water, and
   component B comprises
   (D) 0.1-20 parts by weight of a curing catalyst, and
   (E) 0.1-200 parts by weight of an aliphatic aromatic amine compound;
   wherein the curing catalyst is a tetravalent tin compound; and
   wherein the main chain skeleton of constituent (A) comprises a polyoxyalkylene polymer and/or an alkyl (meth) acrylate ester polymer.

2. The production method for a curable composition according to claim 1, wherein the component A and/or component B further comprise(s) (F) 0.1-20 parts by weight of a silane coupling agent.

3. The production method for a curable composition according to claim 1, wherein the component A and/or component B further comprise(s) (G) 50-800 parts by weight of an inorganic filler.

4. The production method for a curable composition according to claim 1, wherein the component A and/or component B further comprise(s) (H) 1-300 parts by weight of a plasticizer.

5. The production method for a curable composition according to claim 2, wherein the component A and/or component B further comprise(s) (G) 50-800 parts by weight of an inorganic filler.

6. The production method for a curable composition according to claim 2, wherein the component A and/or component B further comprise(s) (H) 1-300 parts by weight of a plasticizer.

7. The production method for a curable composition according to claim 3 wherein the component A and/or component B further comprise(s) (H) 1-300 parts by weight of a plasticizer.

8. The production method for a curable composition according to claim 1, wherein the tetravalent tin compound is an organotin compound.

9. The production method for a curable composition according to claim 1, wherein the curable composition is a sealing material.

10. The production method for a curable composition according to claim 1, wherein the curable composition is a coating material.

11. The production method for a curable composition according to claim 1, wherein the curable composition is an adhesive material.

* * * * *